United States Patent
Filatov et al.

(10) Patent No.: US 12,438,844 B2
(45) Date of Patent: Oct. 7, 2025

(54) SYSTEM AND METHOD FOR SECURING IoT DEVICES THROUGH A GATEWAY

(71) Applicant: AO Kaspersky Lab, Moscow (RU)

(72) Inventors: Konstantin M. Filatov, Moscow (RU); Victor V. Yablokov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 376 days.

(21) Appl. No.: 17/951,357

(22) Filed: Sep. 23, 2022

(65) Prior Publication Data

US 2023/0344797 A1    Oct. 26, 2023

(30) Foreign Application Priority Data

Apr. 22, 2022   (RU) ................. 2022111036

(51) Int. Cl.
*H04L 9/40*      (2022.01)
*G06F 8/65*      (2018.01)
*G16Y 30/10*     (2020.01)

(52) U.S. Cl.
CPC ........... *H04L 63/0236* (2013.01); *G06F 8/65* (2013.01); *H04L 63/1416* (2013.01); *H04L 63/1425* (2013.01); *H04L 63/1441* (2013.01); *G16Y 30/10* (2020.01)

(58) Field of Classification Search
CPC ............. H04L 63/0236; H04L 63/1416; H04L 63/1425; H04L 63/1441; G06F 8/65; G16Y 30/10
See application file for complete search history.

(56) References Cited

U.S. PATENT DOCUMENTS

| | | | |
|---|---|---|---|
| 10,826,918 B1* | 11/2020 | Rasovic | H04L 67/125 |
| 11,374,903 B1* | 6/2022 | Li | H04L 63/0227 |
| 11,457,031 B1* | 9/2022 | Bisht | H04L 63/1416 |
| 11,722,492 B1* | 8/2023 | Obaidi | H04L 63/145 |
| | | | 726/13 |
| 2018/0040172 A1* | 2/2018 | Funk | G07C 5/0808 |
| 2018/0041546 A1* | 2/2018 | Gomez | H04L 63/205 |
| 2018/0060159 A1* | 3/2018 | Justin | G06F 11/0751 |
| 2019/0268307 A1* | 8/2019 | Lancioni | H04L 63/20 |

(Continued)

OTHER PUBLICATIONS

Makhdoom et al. "Anatomy of Threats to the Internet of Things", IEEE Communications Surveys & Tutorials, vol. 21, No. 2, pp. 1636-1675, Secondquarter 2019. (Year: 2019).*

*Primary Examiner* — Hee K Song
(74) *Attorney, Agent, or Firm* — ArentFox Schiff LLP; Michael Fainberg (57) ABSTRACT

A method for securing a plurality of IoT devices using a gateway includes intercepting, by a gateway, information about interactions between a first IoT device and at least one of: a second IoT device, a computer server, and a computer service. One or more cyber security threats are detected by the gateway based on the intercepted information and based on information stored in at least one of a first database and a second database. The first database is configured to store information about IoT devices and the second database is configured to store information about cyber security threats. One or more cyber security threat mitigation actions are identified by the gateway to address the detected one or more cyber security threats. The identified one or more cyber security threat mitigation actions are performed by the gateway.

18 Claims, 4 Drawing Sheets

(56) References Cited

U.S. PATENT DOCUMENTS

| | | | | |
|---|---|---|---|---|
| 2020/0412728 | A1* | 12/2020 | Gupta | H04L 63/1416 |
| 2022/0043911 | A1* | 2/2022 | Pomerantsev | G06F 21/566 |
| 2022/0103588 | A1* | 3/2022 | Shaw | H04W 72/51 |
| 2022/0278993 | A1* | 9/2022 | Korakin | H04L 63/20 |
| 2022/0284096 | A1* | 9/2022 | Gadhe | G06F 21/577 |
| 2022/0294854 | A1* | 9/2022 | Tikhomirov | H04L 67/34 |
| 2022/0337611 | A1* | 10/2022 | Brazao | G16Y 20/20 |

* cited by examiner

SYSTEM AND METHOD FOR SECURING IoT DEVICES THROUGH A GATEWAY

CROSS-REFERENCE TO RELATED APPLICATION

This application claims benefit of priority under 35 U.S.C. 119(a)-(d) to a Russian Application No. 2022111036 filed on Apr. 22, 2022, which is incorporated by reference herein.

FIELD OF TECHNOLOGY

The present disclosure relates to information security technologies for IoT devices, and more specifically, to systems and methods for securing Internet of Things (IoT) devices through a gateway.

BACKGROUND

Currently, an increasing number of devices, such as, but not limited to, computers, smartphones, and household appliances are connected to the Internet. The Internet is a global system of interconnected computer networks that use the standardized Internet Protocol Suite (TCP/IP), including the Transmission Control Protocol (TCP) and the Internet Protocol (IP), to serve billions of users worldwide. When connecting devices to the Internet, users get the opportunity to update the devices themselves, accurately monitor the status of devices (for example, a refrigerator) and integrate the devices themselves into the so-called "smart home" concept. The "smart home" concept enables users to automatically control such "smart" devices from one point, checking the operating status of the devices, and adjusting the devices to accommodate users' personal needs. The concept of a "smart home" is closely related to another concept called the Internet of Things (IoT), which implies the interaction of the aforementioned devices without direct human intervention.

Currently, users widely use routers that enable users to create wireless networks, which in turn enable connections of the smart devices to the Internet. Various routers typically support the possibility of creating so-called heterogeneous networks. An example of a heterogeneous network is a network of smart devices ("smart" things) (IoT devices), some of which are connected to the router via a wireless Wi-Fi network, while other devices are connected to the router via Bluetooth.

With the continuous growth of interconnected network devices, the number of attempts to maliciously use such devices began to grow as well. A significant security problem in today's open communication networks is the spread of malware that infects IoT devices. Due to the fact that IoT devices often do not have a high-performance computing platform and due to the fact that IoT devices typically run a small operating system (OS) or a simple boot loader, the use of any security policies or antivirus applications is typically redundant.

More often than not, IoT devices may generate a large amount of traffic, which might be used by the creators of botnets. An example of a botnet is the Hide'n'Seek botnet, which uses a peer-to-peer (p2p) infrastructure, which makes it more difficult to detect such botnets.

It should be noted that the widespread adoption of IoT devices may lead to privacy violations. At least in some cases, a person may trust a number of devices to monitor data that can directly or indirectly relate to their personal information, such as, pulse, calorie consumption ("smart" fitness bracelet), call frequency ("smart" clock), temperature and humidity in the house ("smart" appliances such as a thermometer and a hydrometer with feedback) and others. Although the level and quality of service directly depends on the use of information from such devices, not all users are ready to share at least a portion of their personal information to the Internet.

Some of the latest problems may also involve security issues associated with the functioning of "smart" equipment within the framework of a "smart" home. For example, it might be unacceptable for the air temperature to rise above 23-25 degrees Celsius in the warm season, even if the settings of a thermostat allow users to raise the temperature higher. In addition, intruders may be able to disable a number of sensors by changing settings, for example.

The aforementioned problems may become catastrophic if cybersecurity vulnerabilities are exploited for the Industrial Internet of Things (IIoT). Typically, IIoT includes a multi-level system that may include sensors and controllers installed on system nodes and assemblies of an industrial facility, and may further include modules for transmitting the collected data and for generating data visualization. If one of the IIoT nodes gets compromised, then it might be possible to refuse service not just to one device or set of devices in the house, but may even lead to a change in the operation or failure of critical infrastructure within the entire city (for example, urban traffic management systems and/or operation of the city cameras).

Thus, there is a need for efficient detection of malicious applications capable of infecting IoT devices.

SUMMARY

Disclosed is a solution for securing a plurality of IoT devices.

In one aspect, a method for securing a plurality of IoT devices using a gateway includes intercepting, by a gateway, information about interactions between a first IoT device and at least one of: a second IoT device, a computer server, and a computer service. One or more cyber security threats are detected by the gateway based on the intercepted information and based on information stored in at least one of a first database and a second database. The first database is configured to store information about IoT devices and the second database is configured to store information about cyber security threats. One or more cyber security threat mitigation actions are identified by the gateway to address the detected one or more cyber security threats. The identified one or more cyber security threat mitigation actions are performed by the gateway.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for securing IoT devices through a gateway. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

IoT devices may include, but are not limited to, everyday devices such as watches, televisions, cameras, digital video disk (DVD) players, refrigerators, audio players, voice recorders, air conditioners, bracelets, air cleaners, heart rate monitors, ovens, microwave ovens, thermostats, washers, driers, set-top boxes, home automation control panels, security control panels, gaming consoles (Xbox™, PlayStation™), electronic dictionaries, electronic keys, camcorders, electronic picture frames, and the like. IoT devices typically may have access to the Internet (or a local network) through various types of connections, such as, but not limited to, Wi-Fi or Bluetooth. IoT devices may create network connections, receive and process incoming traffic, and may have Application Programming Interfaces (APIs), which may enable users not only to monitor the parameters of the device, but also may allow users to configure the devices. In addition, IoT devices may include a number of network components, such as, but not limited to, signal amplifiers and extenders.

IoT devices may be employed in various fields, such as, but not limited to, motor transport (for example, automotive), consumer goods (for example, smart watches), infrastructure sensors (for example, a humidity sensor or a temperature sensor), medicine (for example, a pacemaker with the ability to send data about pacemaker's work to a local server), smart homes and others. IoT devices may be combined into an infrastructure that the devices to perform tasks at the level of not only an individual or household, but also at the more global levels, such as cities or states.

IoT devices may be used for different purposes, and their compromise/theft/damage may lead to different consequences for the user and the entire infrastructure as a whole.

Glossary: a number of terms are defined herein which will be used to describe variant aspects of the present disclosure.

"Cyber threat", as used herein, refers to a threat of data loss or disruption of the computer system or network as a result of a cyber attack.

A "cyber attack," as used herein, refers to an unauthorized impact on a computer system or network by special software or hardware in order to disrupt network's operation, obtain classified information, and the like.

Figure 4:
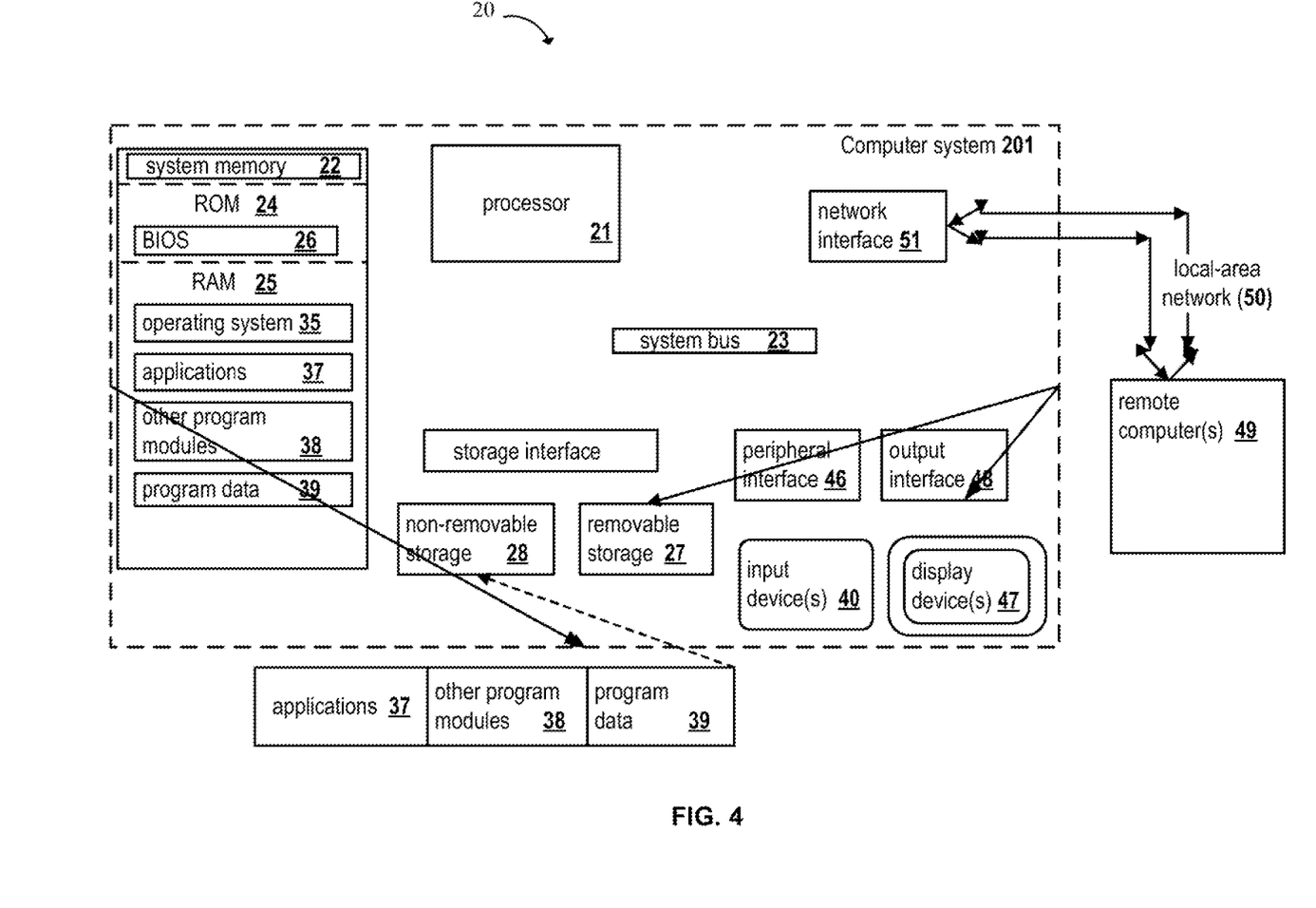
FIG. 4 shows an example of a computer system on which the variant aspects of systems and methods disclosed herein may be implemented.

The terms "modules of the system" and "remote server", as used herein, refer to real devices, systems, components, groups of components implemented using hardware, such as integrated circuits (application-specific integrated circuit, ASIC) or field-programmable gate array (FPGA), or, for example, as a combination of software and hardware, such as a microprocessor system and a set of software instructions, as well as on neuromorphic chips. neurosynaptic/neuromorphic chips. The functionality of the modules of the system may be implemented solely by hardware, as well as in combination, wherein part of the functionality of the system module is implemented by software, and another part is implemented by hardware. In some aspects, parts or all of the modules may be executed on a processor of a computer (for example, as shown in FIG. 4). In this case, the components (each of the modules) of the system may be implemented within the framework of both one computing device and spaced between several interconnected computing devices.

Figure 1:
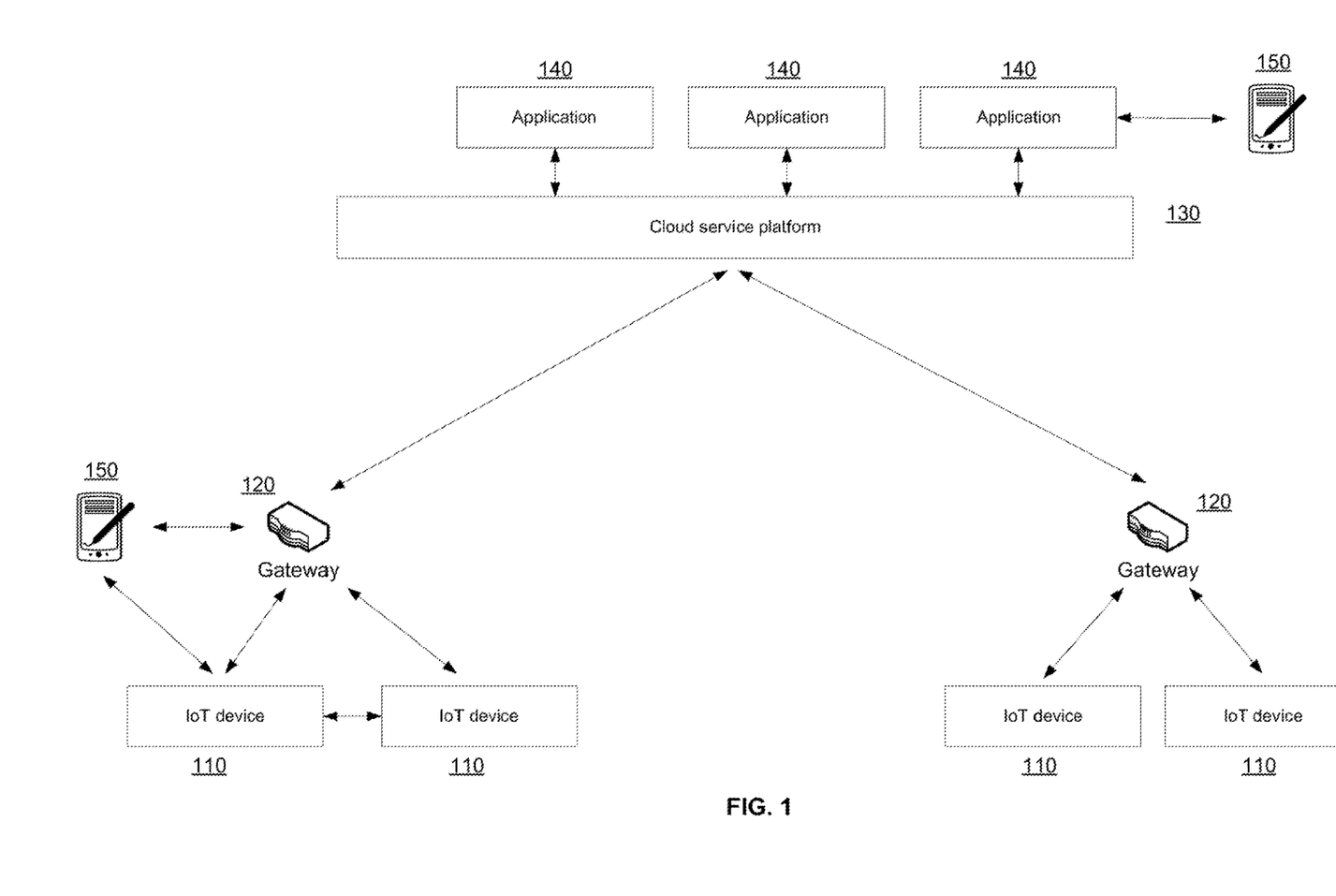
FIG. 1 shows schematically a particular example of an IoT infrastructure.

FIG. 1 shows schematically a particular example of an IoT infrastructure. IoT devices 110 (hereinafter referred to as devices) may be both wearable objects for people (smartphone, smart watch, etc.), and sensors inside the vehicle or home, as well as various sensors in the enterprise. Devices 110 may receive, process and transmit information (for example, temperature data) to other similar devices 110 and different devices 150 (for example, the smartwatch may be paired with a smartphone using Bluetooth protocol) via gateway (access point) 120. Gateway 120 may be a home router or other network device (such as a hub or switch) configured to transmit data over the network. The gateway 120 may support various communication protocols. For example, the ZigBee protocol may be used for some devices 110 and an Ethernet protocol may be used to connect to a cloud service platform 130.

The cloud service platform 130 may include one or more remote data processing servers. Within the cloud service platform 130, applications 140 may be running that allow data from devices 110 to be processed and interpreted. Users may use individual devices 150 (such as smartphones, personal computers, etc.) to control the devices 110, either directly or through applications 140. Typically, one or more gateways 120 with connected devices 110 and 150 form a Personal Area Network (PAN).

An example of IoT infrastructure is the smart home platform from Xiaomi. The devices 110 may include Yeelight Smartbulb lighting lamps, a Mi Smart Power Plug surge protector, a Mi Smart Remote Center control, and the like. To process data from these devices, the proprietary cloud platform 130 Mi Eco Cloud may be used, which may enable the use of various applications 140 (including third-party ones) for data processing and control of devices 110.

Figure 2:
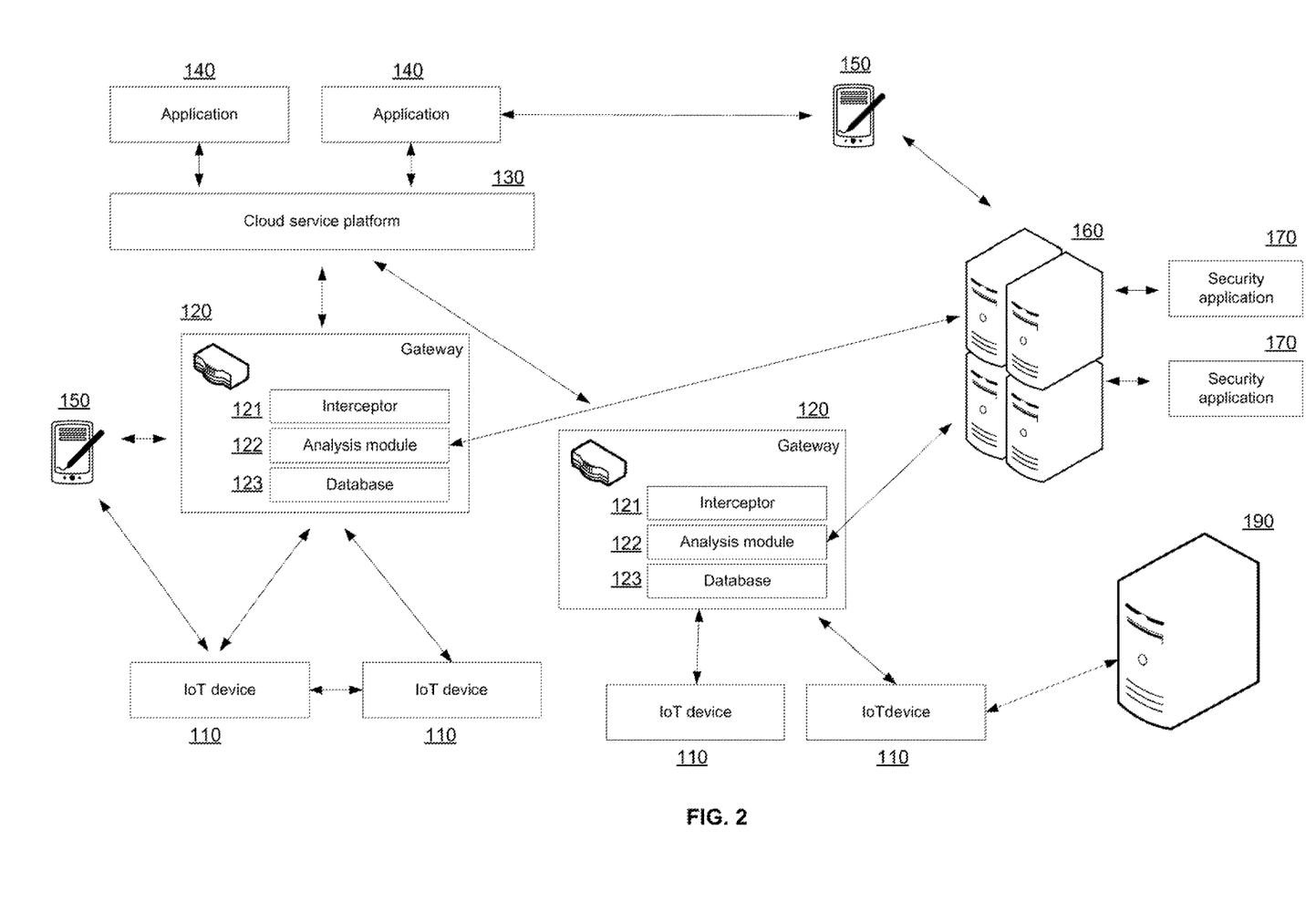
FIG. 2 shows schematically an example of a security model of IoT devices that utilizes a gateway.

FIG. 2 shows schematically an example of a security model of IoT devices that utilizes a gateway, in accordance with aspects of the present disclosure.

Manufacturers of IoT devices 110 very often do not address security of such devices, simplifying configuration and use of the IoT devices 110 by end users. For example, device manufacturers may set standard logins/passwords to access the management console on all released devices of the same model, may not update the libraries installed on them with known vulnerabilities in time, and the like. These vulnerabilities may allow attackers to gain remote control over devices 110 and may enable use of the compromised devices 110 either as part of botnets, or for other malicious purposes, such as obtaining private information about the user of the device 110 for the purpose of subsequent blackmail.

The specificity of IoT devices 110 (non-standard firmware or operating system, a small amount of memory, the absence of a standard installation of third-party software provided by the manufacturer, autonomous operation without the possibility of constant charging) typically prevents installation of full-fledged protective and anti-virus solutions on the IoT devices.

Aspects of the present disclosure contemplate installation of a security solution on the gateway 120 (e.g., a router, switch, and the like), through which devices 110 in the user's home network access the Internet. In an aspect, the installed security solution may be configured to minimize the likelihood and consequences of infection of IoT devices 110, as well as configured to identify infected devices 110 on a particular home network.

The disclosed system may include at least one device 110 communicating with the cloud service platform 130 and applications 140 via at least one gateway 120. In an aspect, the gateway 120 may include an interceptor 121 and an analysis module 122 that may interact with the security service 160 and security applications 170.

The interceptor 121 may be configured to obtain information about the interaction of devices 110 with other devices 110, 150, services and servers (e.g., cloud service 130 and/or malicious server 190) by intercepting incoming and outgoing traffic of devices 110 connected to the gateway 120. It should be noted that in the event that the device 110 was infected prior to the installation of the proposed solution, or if the device 110 was compromised after the installation of the proposed solution, for example, infected by direct connection to it, the infected/compromised device 110 may interact not only with the cloud service 130, but also may interact with at least one remote malicious server 190.

Interactions of the device 110 with the cloud service 130, the malicious server 190, and the applications 140, may generate network traffic. The interceptor 121, as mentioned above, may be configured to perform actions to obtain information about the interaction of the devices 110 with at least one of the following: cloud service platform 130, remote malicious server, other IoT devices 110 and personal devices 150. Furthermore, the interceptor 121 may be configured to:
  intercept DNS/HTTP/HTTPS requests from IoT devices 110 on the user's home network;
  extract domains and URLs from the intercepted requests;
  interrupt the incoming traffic to device 110 to a predetermined set of TCP/UDP ports (telnet/SSH ports and other ports associated with other services that provide remote access to the device 110), wherein the aforementioned set of ports may be changed according to the information received from the security service 160;
  detect presence of open TCP/UDP ports (telnet/SSH ports and other services that provide remote access to the device) on devices 110.

In addition, the interceptor 121 may be configured to perform the security action identified by the analysis module 122 based on the cyber threat determined by the analysis module 122. In an aspect, the aforementioned security action may be applied to at least one of:
  IoT device 110 in the network;
  network as a whole.

To perform a security action that may apply to the network as a whole, the interceptor 121 may perform at least one of the following:
  block connections of the IoT device 110 with the domain and URL based on a decision of the analysis module 122;
  block connections of IoT device 110 with other IoT devices 110 by based on a decision of the analysis module 122.

To perform a security action that may apply to an IoT device, the interceptor 121 may perform at least one of the following:
  reboot the device 110 based on a decision of the analysis module 122;
  update password of the IoT device 110 based on a decision of the analysis module 122;
  update firmware version of the device 110 based on a decision of the analysis module 122;
  verify access to the device 110 via Telnet/SSH ports received from the analysis module 122 and return the verification results to the analysis module 122;
  verify access to the device 110 via passwords received from the analysis module 122, and return the verification results to the analysis module 122.

The information received by the interceptor 121 may be transmitted to the analysis module 122 to identify possible information security problems and cyber threats in the network. The analysis module 122 may be connected to the database 123, which may store descriptions of the devices 110 and descriptions of the remote malicious servers 190. The descriptions of the remote malicious servers 190 may include, but is not limited to, URLs of the remote malicious servers 190, certificates and certificate chains of the remote malicious servers 190, convolutions over http responses or pages of the remote malicious servers 190. In general, due to the limited amount of memory in the database 123, the database 123 may contains the most up-to-date data on IoT devices 110. It should be noted, that the analysis module 122 may receive the information for storing in the database 123 from the security service 160 (discussed in greater detail below).

In an aspect, to detect cyber threats, the analysis module 122 may be configured to perform at least one of the following actions:
  determine a description of the device 110 (e.g., by contacting the device 110 at a specific port number, opening a web page corresponding to the address of the device 110, and/or other methods known in the art). The description of the device may include, but is not limited to a type of the device 110 (e.g., webcam), manufacturer of the device 110 (e.g., Xiaomi), model of device 110 (e.g., XVV-B 10), and firmware version of the device 110 (device software version);
  receive information about the device 110 from the security service 160 in the event that a new device 110 is detected on the network. The received information may include, but is not limited to, telnet/SSH ports of the device 110, allowed domains and URLs for the device 110, as well as allowed for interaction other devices 110 in the network (for example, the webcam may interact with other cameras or with the IP video recorder and send initialization requests itself);
  check domains and URLs from the intercepted traffic in a table of domains and URLs (which may be stored in the database 123) that may be used by malicious applications for devices 110;
  check the intercepted traffic against the hash database of malicious applications for devices 110 (which may be stored in the database 123).

In an aspect, the analysis module 122 may be further configured to determine security threat mitigation actions, which may depend on a particular cyber threat. Examples of mitigation actions may include, but are not limited to:
  generation of a decision to block domains and/or URLs, in response to finding the domains/URLs stored in the database 123 in the outgoing traffic. The generated solution may be sent to the interceptor 121. In addition, the analysis module 122 may notify a user that device 110 is likely infected. In an aspect, the analysis module 122 may notify the user by sending an alert to the user device 150 via e-mail, push notification, and other known methods of transmitting information. In an aspect, the analysis module 122 may transmit user alerts to the security service 160;

generation of a decision to block incoming traffic, in response to finding the hash value of the incoming traffic in the hash table of malicious applications associated with the device 110. In an aspect, the analysis module 122 may notify the user of the device 110;

generation of a decision to check the ability to connect to the device 110 using a table of known weak passwords (which may be a part of the database 123), in response to detecting the presence of open Telnet/SSH ports on the device 110. In an aspect, the analysis module 122 may transmit the generated decision to the interceptor 121;

generation of a decision to restart a device 110, in response to determining that the device 110 is likely infected, if the possibility of such a remote restart is present. In an aspect, the analysis module 122 may transmit the generated decision to the interceptor 121. It should be noted that often a malicious application, due to the limited amount of permanent memory of the device 110 and manufacturer-specific firmware protocols of the device 110 may not be written into permanent memory, but rather may be executed in the operating memory of the device 110;

generation of a decision to change the password of a device 110, in response to determining that the device 110 is likely infected or in response to determining that the device 110 has a weak password, if the possibility of such password change exists. In an aspect, the analysis module 122 may transmit the generated decision to the interceptor 121.

generation of a decision to update firmware of a device 110, in response to determining that the device 110 is likely infected or in response to receiving information from the security service 160 about the release of a new firmware version of the device 110, if the possibility of such update exists. In an aspect, the analysis module 122 may transmit the generated decision to the interceptor 121;

generation of a decision to block a connection associated with an anomaly, in response to detecting the anomaly in the intercepted traffic to/from the device 110 (in this case, the device 110 is likely to be infected). In an aspect, the analysis module 122 may transmit the generated decision to the interceptor 121 and/or may send a corresponding notification to a user.

The term "anomaly", as used herein, refers to an identified deviation in the traffic of devices 110 over a period of time. For example, when hackers are trying to figure out passwords from the outside of the network, the number of connections to devices 110 from different IP addresses typically increases. Such devices 110 may be considered likely infected by the disclosed system, since the probability of guessing the password, even if it has been changed, exists. Devices 110 often, due to their simplicity, do not have any protection against brute force password guessing, since devices 110 typically do not set timeouts after several incorrect password attempts (for example, 30 seconds after three incorrect password inputs), so the password may be guessed relatively fast. In the aforementioned scenario, the disclosed system may block connections and may send corresponding notifications to a user. In another non-limiting example the device 110 may scan the IP addresses of the network and may attempt to connect to other devices 110. In this case, the analysis module 122 may block connections and may send corresponding notifications to a user.

In an aspect, if the analysis module 122 fails to determine an appropriate security threat mitigation action, the analysis module 122 may send a request to the security service 160 asking about a security threat mitigation action to be performed.

In an aspect, the security service 160 may interact with the analysis module 122. In general, the cloud security service 160 may be a service on a remote server. In an aspect, the security service 160 may be configured to provide data for the database 123 that may contain both data associated with devices and data describing cyber threats. In one aspect, the database 123 may be divided into two databases (a database for storing data associated with devices, and a database for storing data describing cyber threats).

The data associated with the devices may include, but is not limited to:
  a description of the devices 110 (discussed above);
  firmware versions for devices 110;
  a list of weak passwords for devices 110.

Data describing cyber threats may include, but is not limited to:
  domains and URLs used by malicious applications for devices 110;
  Telnet/SSH ports that are open for devices 110 (it should be noted that the ports may differ depending on the current firmware version of the device 110).

It should be noted that the data for the domains and URLs used by malicious applications for devices 110, in an aspect, may be generated using security applications 170. In an aspect, pre-configured virtual machines can be used that are specifically hosted on the Internet without security solutions, emulate devices 110 and contain all known vulnerabilities used by malicious applications for hacking. Such virtual machines are so called IoT-Honeypot.

As used herein, weak passwords are both passwords that do not meet the requirements (for example, but not limited to, words from a dictionary without capital letters, numbers and/or special characters), so-called "factory" passwords from the manufacturer, default login passwords (e.g., admin: admin), passwords leaked to the Internet (for example, in publications in the press about vulnerabilities, from the databases of known password leaks distributed in the "dark" segments of the Internet, which may be hidden by networks, connections in which may be established only between trusted nodes using non-standard protocols and ports, such as on the DarkNet). In an aspect, weak passwords may be obtained using the mentioned security applications 170—IoT-HoneyPot.

In an aspect, the security service 160 may notify the user of the devices 110 based on the data from the analysis module 122.

In an aspect, the security service 160 may augment databases based on data from the analysis module 122. So, for example, if the analysis module 122 detects open ports on the device 110 that were not previously known to the security service 160, and/or transmitted data contains anomalies associated with previously unknown domains and URLs, then such data may be analyzed by the security service 160 and may be added to the database 123 for future reference.

It should be noted that the interceptor 121 and the analysis module 122 may be performed both as components of the anti-virus solution and/or components of Endpoint Detection and Response (EDR) solution. In this case, a security threat mitigation action may be generated by the security service 160.

Figure 3:
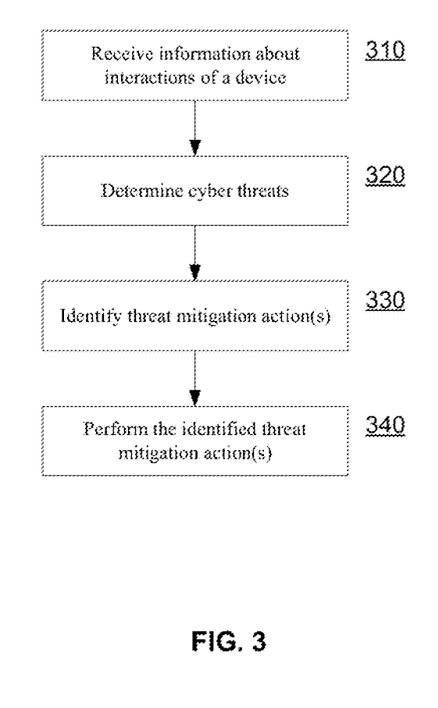
FIG. 3 is a flowchart illustrating an example method for securing IoT devices through a gateway.

FIG. 3 is a flowchart illustrating an example method for securing IoT devices through a gateway.

At block 310, the interceptor 121, which may be located on the gateway 120, may receive information about the interaction of the device 110 with at least one of: other devices 110, service, server. The interceptor 121 is discussed in greater detail above in conjunction with FIG. 2.

In one aspect, in order to obtain information about the interaction of devices 110 with other devices 110, services, and servers the interceptor 121 may perform one of the following actions:
- interception of DNS/HTTP/HTTPS requests from devices 110;
- extraction of data about domains and URLs from intercepted requests;
- interception of incoming traffic to devices 110 on a predetermined set of TCP/UDP ports;
- determination whether the device 110 has open TCP/UDP ports that provide remote access to device 110.

At block 320, the analysis module 122, which may be located on at least one gateway 120, may determine cyber threats by interacting with the security service 160 based on the data received from the interceptor 121. In an aspect, the security service 160 may be configured to provide data to the analysis module 122, while data may be contained in at least one of the databases:
- a database associated with devices 110;
- a database describing cyber threats.

The analysis module 122 and the security service 160 are discussed in greater detail above in conjunction with FIG. 2.

In one aspect, the analysis module 122 by interacting with the remote security server 160 based on the data received from the interceptor 121 may determine a description of the device 110. The description of the device 110 may include at least the type of device 110, the manufacturer of the device 110, the device model 110, the firmware version of the device 110. In an aspect, the analysis module 122 may receive information about the device 110 from the security service 160. The information received from the security service may include at least the Telnet/SSH ports of the device 110, allowed domains, and URLs for the device 110, as well as devices allowed for interaction on the network. In an aspect, the analysis module 122 may also check domains and URLs from the intercepted traffic on the database of domains and URLs used by malicious applications for devices 110 based on the data provided by the security service 160.

In an aspect, the database associated with the devices 110 may include a description of the devices 110, the firmware version of the devices 110, and weak passwords for the devices 110.

In yet another aspect, the cyber threat database may contain domains and URLs used by malicious applications for devices 110, and open Telnet/SSH ports specific to devices 110.

At block 330, the analysis module 122 may identify a threat mitigation action that may depend on a particular cyber threat. In an aspect, the threat mitigation action may be applied to at least one of:
- the device 110 in the network;
- network as a whole.

In one aspect, the threat mitigation action that applies to the network device 110 may be:
- rebooting the device 110;
- updating the password of the device 110;
- updating the firmware version of the device 110;
- checking access to the device 110 via Telnet/SSH ports;
- checking access to the device 110 by passwords.

In yet another aspect, the threat mitigation action that applies to the entire network may be:
- blocking the connection of the device 110 with other devices 110;
- blocking the connection of the device 110 with domains and URLs.

In yet another aspect, a threat mitigation action that is applied to the network device 110 may be detected as follows:
- a decision may be generated to check the connectivity to the device 110 using a database of known weak passwords based on the data provided by the security service 160, in response to detecting the presence of open Telnet/SSH ports on the device 110 and/or the ability to connect to the device 110 via a password;
- a decision may be generated to change the password of the device 110, in response to identifying a device 110 with a weak password;
- a decision may be generated to update the firmware version, in response to receiving information from the security service 160 about the release of a new firmware version.

In yet another aspect, the threat mitigation action that applies to the entire network may be performed as follows:
- devices 110 may block connections to domains and URLs detected in the outgoing traffic, in response to determining that these domains and URLs found in the outgoing traffic are also found in a corresponding database;
- the devices 110 may block the connections associated with an anomaly, in response to identifying anomalies in the intercepted traffic.

In another aspect, the analysis module 122 may ask the security service 160 about the threat mitigation action that needs to be performed.

At block 340, the interceptor 121 may perform the threat mitigation action identified by the analysis module 122 to ensure security based on the cyber threat identified by the analysis module 122.

FIG. 4 shows an example of a computer system on which variant aspects of systems and methods disclosed herein may be implemented. The computer system 20 may represent the system configured to implement a method for securing IoT devices through a gateway of FIG. 2 and can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, 12C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for securing a plurality of IoT devices using a gateway comprising:
intercepting, by a gateway, information about interactions between a first IoT device and at least one of: a second IoT device, a computer server, and a computer service;
detecting, by the gateway, one or more cyber security threats based on the intercepted information and based on information stored in at least one of a first database and a second database, wherein the first database is configured to store information about IoT devices and wherein the second database is configured to store information about cyber security threats;
identifying, by the gateway, one or more cyber security threat mitigation actions to address the detected one or more cyber security threats including at least one of: updating password of the first IoT device, updating firmware of the first IoT device, checking access to the first IoT device via Telnet/SSH port, and checking access to the first IoT device by guessing passwords; and
performing, by the gateway, the identified one or more cyber security threat mitigation actions.

2. The method of claim 1, wherein intercepting information further comprises at least one of:
intercepting at least one of a DNS request, HTTP request, HTTPS request transmitted from the first IoT device to the second IoT device;
extracting domain name information and a URL information from the intercepted at least one of the DNS request, HTTP request and HTTPS request;
intercepting traffic received by the first IoT device on a predefined set of TCP/UDP ports;
determining whether the first IoT device has open TCP/UDP ports, wherein the open TCP/UDP ports provide remote access to the first IoT device.

3. The method of claim 1, wherein the one or more cyber security threat mitigation actions are configured to be applied to traffic across entire network, and wherein the one or more cyber security threat mitigation actions comprise at least one of:
blocking the first IoT device from connecting to other IoT devices in the network; and
blocking first IoT device's connections to domains and URLs.

4. The method of claim 3, wherein identifying the one or more cyber security threat mitigation actions configured to be applied to the traffic across entire network further comprises:
blocking first IoT device's connections to domains and URLs, in response to detecting the domains and URLs in the traffic outgoing from the first IoT device and in response to finding the domains and URLs in the second database; and
blocking connections associated with an anomaly, in response to detecting the anomaly in the intercepted traffic.

5. The method of claim 1, further comprising determining a description of the first IoT device based on the intercepted information, wherein the description of the first IoT device comprises at least one of: a type of the first IoT device, manufacturer of the first IoT device, model of the first IoT device, firmware version of the first IoT device; information about the first IoT device received from a security service.

6. The method of claim 4, wherein identifying the one or more cyber security threat mitigation actions configured to be applied to the first IoT device further comprises:
checking access to the first IoT device by guessing passwords using the first database based on data provided by a security service, in response to detecting open Telnet/SSH ports;
updating password of the first IoT device, in response to detecting a weak password of the first IoT device; and
updating firmware version of the first IoT device, in response to receiving information from the security service indicating release of a new firmware version of the first IoT device.

7. The method of claim 1, wherein the first database is configured to store at least the following information: descriptions of IoT devices, firmware versions of IoT devices, and a list of weak passwords for IoT devices.

8. The method of claim 1, wherein the second database is configured to store at least the following information: domains and URLs used by malicious device applications, device-specific open Telnet/SSH ports.

9. The method of claim 1, wherein the one or more cyber security threat mitigation actions are identified by a security service.

10. A system for securing a plurality of IoT devices comprising:
a memory and a hardware processor of a gateway configured to:
intercept information about interactions between a first IoT device and at least one of: a second IoT device, a computer server, and a computer service;
detect one or more cyber security threats based on the intercepted information and based on information stored in at least one of a first database and a second database, wherein the first database is configured to store information about IoT devices and wherein the second database is configured to store information about cyber security threats;
identify one or more cyber security threat mitigation actions to address the detected one or more cyber security threats including at least one of: updating password of the first IoT device, updating firmware of the first IoT device, checking access to the first IoT device via Telnet/SSH port, and checking access to the first IoT device by guessing passwords; and
perform the identified one or more cyber security threat mitigation actions.

11. The system of claim 10, wherein the hardware processor configured to intercept information is further configured to:
intercept at least one of a DNS request, HTTP request, HTTPS request transmitted from the first IoT device to the second IoT device;
extract domain name information and a URL information from the intercepted at least one of the DNS request, HTTP request and HTTPS request;
intercept traffic received by the first IoT device on a predefined set of TCP/UDP ports;
determine whether the first IoT device has open TCP/UDP ports, wherein the open TCP/UDP ports provide remote access to the first IoT device.

12. The system of claim 10, wherein the one or more cyber security threat mitigation actions are configured to be applied to traffic across entire network, and wherein the one or more cyber security threat mitigation actions comprise at least one of:
blocking the first IoT device from connecting to other IoT devices in the network; and
blocking first IoT device's connections to domains and URLs.

13. The system of claim 12, wherein the hardware processor configured to identify the one or more cyber security threat mitigation actions configured to be applied to the traffic across entire network is further configured to:
block first IoT device's connections to domains and URLs, in response to detecting the domains and URLs in the traffic outgoing from the first IoT device and in response to finding the domains and URLs in the second database; and
block connections associated with an anomaly, in response to detecting the anomaly in the intercepted traffic.

14. The system of claim 10, wherein the hardware processor is further configured to determine a description of the first IoT device based on the intercepted information, wherein the description of the first IoT device comprises at least one of: a type of the first IoT device, manufacturer of the first IoT device, model of the first IoT device, firmware version of the first IoT device; information about the first IoT device received from a security service.

15. The system of claim 10, wherein the hardware processor configured to identify the one or more cyber security threat mitigation actions configured to be applied to the first IoT device further is further configured to:
check access to the first IoT device by guessing passwords using the first database based on data provided by the security service, in response to detecting open Telnet/SSH ports;
update password of the first IoT device, in response to detecting a weak password of the first IoT device; and
update firmware version of the first IoT device, in response to receiving information from the security service indicating release of a new firmware version of the first IoT device.

16. The system of claim 10, wherein the first database is configured to store at least the following information: descriptions of IoT devices, firmware versions of IoT devices, and a list of weak passwords for IoT devices.

17. The system of claim 10, wherein the second database is configured to store at least the following information: domains and URLs used by malicious device applications, device-specific open Telnet/SSH ports.

18. A non-transitory computer readable medium storing thereon computer executable instructions for securing a plurality of IoT devices using a gateway, including instructions for:
intercepting, by a gateway, information about interactions between a first IoT device and at least one of: a second IoT device, a computer server, and a computer service;
detecting, by the gateway, one or more cyber security threats based on the intercepted information and based on information stored in at least one of a first database and a second database, wherein the first database is configured to store information about IoT devices and wherein the second database is configured to store information about cyber security threats;
identifying, by the gateway, one or more cyber security threat mitigation actions to address the detected one or more cyber security threats including at least one of: updating password of the first IoT device, updating firmware of the first IoT device, checking access to the first IoT device via Telnet/SSH port, and checking access to the first IoT device by guessing passwords; and
performing, by the gateway, the identified one or more cyber security threat mitigation actions.

* * * * *